3,354,198
PROCESS FOR PRODUCTION OF OXYGENATED ORGANIC COMPOUNDS FROM DITERTIARY ALKYL HALIDES
Bernard S. Friedman, Chicago, Ill., assignor, by mesne assignments, to E. I. du Pont de Nemours and Company, a corporation of Delaware
No Drawing. Filed Nov. 29, 1961, Ser. No. 155,814
10 Claims. (Cl. 260—468)

My invention relates to a process for producing oxygenated organic compounds, preferably highly branched polycarboxylic acids and their esters, by condensing poly-tertiary halides with carbon monoxide in the presence of an acid catalyst.

Methods have previously been suggested for the preparation of highly branched, i.e., tertiary, mono-basic acids by condensation of alcohols and olefins at moderate temperatures and pressures with carbon monoxide in the presence of hydrofluoric acid, sulfuric acid, or boron trifluoride complexes with water, sulfuric acid or phosphoric acid. It has also been suggested to attempt the condensation of tertiary alkyl halides with hydrofluoric acid. The results, however, have not been satisfactory. For example, as reported in J.A.C.S. 64, 1356 (1942), the reaction of tertiary butyl chloride with carbon monoxide in the presence of hydrofluoric acid produced only a trace of aliphatic acid. Another method that has been suggested is outlined in U.S. Patents Nos. 2,864,858 and 2,864,859 to Schneider which report the reaction of a mixture of an isoparaffin and an olefin-acting material, i.e., olefin, alcohol or alkyl halide, with carbon monoxide and hydrofluoric acid to obtain organic acids in the reaction product. The examples in these patents, however, mention only the acid formed from the isoparaffin and make no mention of acids derived from the olefin-acting material. It has also been suggested to prepare highly branched dibasic acids from a diol by condensation with carbon monoxide in the presence of sulfuric acid. See U.S. Patent 2,913,489 to Benedictis and Furman. In this suggested process, however, a major portion of the product consists of lactones. Also in many instances the diol will undergo prior cyclization, particularly when employing a hydrofluoric acid catalyst, before reacting with the carbon monoxide and the resulting product is a cyclic monobasic acid. Theoretically, dibasic acids could be prepared by condensation of carbon monoxide with dienes, but it has been found in practice that the diolefins yield polymeric unsaturated hydrocarbons which fail to condense with carbon monoxide in the presence of hydrofluoric acid or sulfuric acid.

I have discovered a process for the production of oxygenated organic compounds, such as polycarboxylic acids and their esters, ketones and lactones, in substantial yields which overcomes the difficulties presented by previously suggested processes. Generally, my process involves condensing poly-tertiary halides with carbon monoxide while in contact with certain acid catalysts. The carbon branched poly-tertiary halides employed in the process of my invention are alkyl, including cycloalkyl, poly-tertiary halides in which a plurality of the halide atoms to be reacted are tertiary and preferably in which the carbon atoms to which such halide atoms are attached are separated by two or more carbon atoms. In the latter case dicarboxylic acids are produced. Thus, the alkyl poly-tertiary halides employed in the process of my invention can have the following structure:

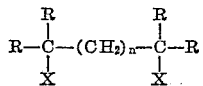

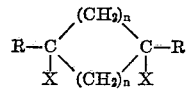

where X=F, Cl, Br, I
$n$ is 0 to a number usually not exceeding about 15 or more and preferably is 2 to 6 or 10. R is an alkyl radical which can be substituted with non-interfering groups if desired as with halogen as can other portions of the feedstock. Preferably, R has 1 to 4 carbon atoms.

The starting halides generally do not have more than about 20 to 30 carbon atoms.

These dihalides can be prepared by treating the corresponding diols or dienes with HX, or by selectively halogenating the parent compound to replace the tertiary hydrogens with X. Where it is desired to produce a tricarboxylic acid, of course, a tri-tertiary halide can be employed, e.g.,

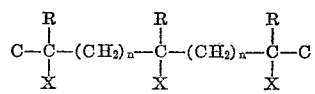

Again $n$ should be at least 2 if the corresponding tricarboxylic acid is to be obtained.

In the process of my invention the catalysts which can be employed are strong inorganic mineral acid catalysts such as, 90–100% hydrofluoric acid (preferably anhydrous), 90–100% sulfuric acid (preferably 95–98%), monohydroxyfluoboric acid, and boron trifluoride complexes of phosphoric acid and sulfuric acid. Generally, the condensation reaction can be conducted at a temperature within the range from about 0 to about 100° C. and a carbon monoxide pressure from about 1 atmosphere to about 3000 p.s.i.g. with a contact time from about 0.1 minute to about 60 minutes. It is preferred, however, to conduct such reaction at a temperature of from about 10 to 40° C. and a carbon monoxide pressure of from about 100 to about 1000 p.s.i.g. with a contact time from about 1 to about 10 minutes. It will be understood that the shorter times will correspond to the higher temperatures.

In the condensation reaction, a mole ratio of catalyst to poly-tertiary halide is maintained in the range of at least about 2:1 and there seems little need to go above about 15:1 although up to about 40:1 or even more can be employed. Preferably, a mole ratio of catalyst to halide in the range from about 3:1 to about 5:1 is employed for a ditertiary halide, while it is preferred to employ a mole ratio of catalyst to halide in the range from about 4:1 to about 6:1 when reacting a tri-tertiary halide.

The reaction of the poly-tertiary halide with carbon monoxide can be performed either in batch, continuous, or semi-continuous operations. Typically, the catalyst is introduced into a stirring autoclave, which is pressured with carbon monoxide, and the poly-tertiary halide is then introduced in continuous or intermittent flow. The carbon monoxide pressure is maintained during the reaction by repressuring and the temperature is controlled by use of heating and cooling coils or jackets. In a batch operation, stirring is continued for a short period of time, generally, from about 5 to 30 minutes, after the addition of the poly-halide to insure completeness of reaction with the carbon monoxide.

Inert solvents such as normal paraffins or unbranched cycloparaffins can be employed in the above reaction in order to moderate the reaction or to dissolve the polyhalides, particularly if they are normally solid.

After the reaction of the poly-halides with the carbon monoxide is completed, the resultant products are hydrolyzed to the acids by treatment with an aqueous medium. When a hydrofluoric acid catalyst has been employed, it may to necessary to heat the products with water or other aqueous medium to a temperature within the range from about 50 to about 100° C. in order to obtain full conversion of the intermediate compounds to the desired organic acids. The resultant products of the carbon monoxide reaction can also be converted to the corresponding acids by the employment of an alkali, however, the use of water is more desirable due to the economics. Generally, mere dilution with water will "spring" the product acid from a sulfuric acid catalyst or catalysts containing boron trifluoride. It will be understood, of course, that it is preferable to employ only the theoretical amount of water, i.e., 1 mole for each organic tertiary halide in the product feed to be converted, inasmuch as the catalyst may be re-used without the necessity of re-concentration, but greater or lesser amounts of water can be used.

If esters rather than acids are desired, the products of the carbon monoxide reaction are diluted with the appropriate alkanol. The alkanols, including alcohols, employed in this step can be mono- or polyhydric, primary or secondary, aliphatic or cycloaliphatic, and of any desired length—usually up to about 20 carbon atoms. Tertiary alcohols are to be avoided since they are usually polymerized by the strong acid catalysts. Methanol, ethanol, isopropanol and other short chain, non-tertiary, lower aliphatic alcohols are preferred from the standpoint of economy. Polyols, such as ethylene glycol, propylene glycol, etc., can be employed when it is desired to obtain polyesters or polymers of esters. The polymeric material is obtained, when a polycarboxylic structure is present. The polyols can also produce a mixture of mono- and polyesters depending upon the ratio of polyol to intermediate compound.

When a hydrofluoric acid catalyst has been employed in the carbon monoxide reaction, it is generally desirable to add a small amount of pyridine and to warm the alcohol-diluted resultant product to about 30–70° C. in order to speed up the esterification reaction and/or to ensure complete conversion of the resultant product to the ester.

Finally, the organic layers are separated from the catalyst layer. Additional dilution with water may be necessary to obtain good separation in this step. The acid catalyst layer can then be extracted with a solvent to recover additional product. The organic acid or ester layer, with or without solvent, is washed with a small amount of water or saturated aqueous sodium sulfate to remove traces of catalyst, and is then dried and purified by distillation or re-crystallization.

In order to illustrate more completely the process of my invention reference is made to the following examples.

*Example I*

Anhydrous hydrofluoric acid in the quantity of 399 grams is charged to a two liter stainless steel stirring autoclave and the autoclave is then pressured to 800 p.s.i.g. with carbon monoxide. A solution of 120 grams of 2,5-dichloro 2,5-dimethylhexane in 431 grams of normal pentane is pressured into the autoclave from a blowcase during a period of 40 minutes. The autoclave is maintained at a temperature of 28–31° C. and stirring is continued for a period of 30 minutes. During the course of the reaction, the pressure in the autoclave rises to 910 p.s.i.g. This increase in pressure is explained by the fact that the hydrogen chloride gas liberated during the reaction offsets the carbon monoxide that is absorbed and further the incoming liquid feed compresses the gases within the autoclave. A quantity of 100 grams of water is then introduced into the autoclave and the entire contents of the autoclave are heated with stirring to 95–97° C. for a period of 30 minutes. The contents of the autoclave are discharged while hot into a polyethylene bottle containing 809 grams of crushed ice. The diluted product is then filtered through a stainless steel screen in order to recover the solid organic product which is in turn dissolved in alkali (A). The filtrate is transferred to a polyethylene separatory funnel and the organic layer (B) is separated. The remaining aqueous layer is extracted with benzene to yield another organic layer (C). The organic layers (B) and (C) are combined and then extracted with alkali. These alkali washes together with the alkali solution (A) previously obtained are combined and washed with pentane in order to remove traces of inerts. The organic acids are then sprung by acidification with concentrated hydrochloric acid, filtered, washed with water and recrystallized from an ethanol and water mixture. This example yields a product weighing 51 grams and having a melting point in the range from 189.5 to 191.5° C. This corresponds to the melting point of 190.5° C. found for 2,2,5,5-tetramethyl-adipic acid by McBay and Tucker, Journal Organic Chemistry 19, 869 (1954).

*Example II*

The process of Example I is repeated employing monohydroxyfluoboric acid as the catalyst instead of hydrofluoric acid and substantially similar results are obtained.

*Example III*

In the same manner as explained in Example I, 399 grams of anhydrous hydrofluoric acid is employed to catalyze the reaction of a solution of 120 grams of 2,5-dichloro-2,5-dimethylhexane in 431 grams of normal pentane with carbon monoxide under a pressure of 800 p.s.i.g. and at a temperature within the range of 28–31° C. After the reaction with carbon monoxide is completed, instead of adding water as in Example I, 87 grams of methanol containing 1 milliliter of pyridine is added to the products in the autoclave and heated at a temperature from 60–70° C. for a period of 30 minutes. The contents of the autoclave are discharged into 815 grams of ice, warmed to room temperature and filtered through a 30-mesh stainless steel screen. The filtrate is then separated into an organic phase and an aqueous phase and the aqueous phase is extracted with benzene. The solid remaining on the filter is dissolved in benzene. This benzene solution together with the benzene extract of the aqueous phase and the organic phase are combined and washed with alkali. The alkali wash acidified with concentrated hydrochloric acid yields only a trace of organic acid. The alkali washed solutions are then dried and fractionated to yield 94 grams of ester boiling at 58–63° C. at 0.3 mm. Hg. The ester is recrystallized from normal pentane and produces a solid which melts at 46.5–47.5° C. A comparison of the theoretical values for the dimethyl ester of 2,2,5,5-tetramethyl-adipic acid and those found for the product of this example are shown below.

Calculated for $C_{12}H_{22}O_4$: C, 62.58%; H, 9.62%. Found: C, 62.52%; H, 9.63%.

*Example IV*

In this example, 92 grams of 2,5-dichloro-2,5-dimethylhexane is dissolved in 394 grams of normal pentane. This solution is injected within the course of 45 minutes into a stainless steel two-liter stirring autoclave containing 307.5 grams of concentrated sulfuric acid and carbon monoxide gas under pressure of 800 p.s.i.g. The temperature in the autoclave is maintained at 50° C. and the pressure within the autoclave rises to about 970 p.s.i.g. After stirring for an additional minute, the product is discharged into 572 grams of ice pre-cooled to −80° C. The product is then warmed to room temperature and filtered to remove a white solid. The filtrate is separated into an organic (pentane) and an aqueous phase. The aqueous phase is extracted five times with 100-milliliter portions of ethyl ether. The white solid is dissolved with ethyl ether. The ether solutions and the pentane solution are then combined and extracted with a sodium bicarbonate solution. The sodium bicarbonate solution is then acidified to yield a solid identified as 2,2,5,5-tetramethyladipic acid. The alkali-insoluble portions are distilled to remove solvent and the residue is cooled to —80° C. and then filtered. The solids recovered in this fashion, have a melting point of 79–80° C. after recrystallization from normal pentane. Infra-red analysis indicates a lactone structure, probably the lactone of 5-hydroxy-2,2,5-trimethylhexanoic acid reported by G. R. Ensor and W. Wilson, J. Chem. Soc. (1956), 4068 to have a melting point of 80.5–81.5° C. Thus, this example provides a yield of 41% dibasic acid and 50% lactone.

*Example V*

In a 300-milliliter autoclave, 8 grams of 85% phosphoric acid is saturated with boron trifluoride at a pressure of 450 p.s.i.g. and a temperature of 63° C. The autoclave is then cooled to 30° C. and vented to atmospheric pressure in order to remove excess boron trifluoride. Carbon monoxide is then introduced into the autoclave until a pressure of 800 p.s.i.g. is obtained. A solution of 28 grams of 2,5-dichloro-2,5-dimethylhexane dissolved in 81 grams of normal pentane is then injected into the autoclave during a 30-minute period. The temperature is maintained at 30–31° C. and stirring is continued for 10 minutes after the introduction of the solution. The product from the autoclave is discharged into ice and then subjected to extraction with pentane and alkali in the manner similar to that explained in the preceding examples. The final produce is obtained by reprecipitation. In this example the yield of dibasic acid is 70% and yield of lactone is 30%.

*Example VI*

In a manner similar to that employed in the preceding examples, 3,6-dichloro-3,6-dimethyloctane is reacted with carbon monoxide in the presence of a hydrofluoric acid catalyst at a temperature of about 27° C. The resulting product is hydrolyzed with water at room temperature to yield a trace of acid and 61% of unconverted feed.

This reaction is repeated employing a condensation temperature of 41° C. The final products include 25% of a liquid cyclic monocarboxylic acid and 66% of an unsaturated cyclic ketone.

*Example VII*

The process of Example VI is repeated using a phosphoric acid-boron trifluoride complex as a catalyst. The catalyst is prepared in the same manner as in Example V. A solution of 54 grams of 3,6-dichloro-3,6-dimethyloctane in 57 grams of normal pentane is injected during a 15-minute period. The temperature is maintained at 27–33° C. and stirring is continued for 10 minutes. The resulting product is then discharged into ice and subjected to extraction with pentane and alkali in the manner similar to that explained in the preceding examples. The final product includes 15% of liquid and solid acids and 80% of lactone (B.P. 225–245° C., $n_D^{20}$ 1.4567–1.4577).

This reaction is repeated employing a condensation temperature of 52° C. The final product includes 25% of solid acid and 70% of lactone.

*Example VIII*

An 87-gram quantity of anhydrous hydrofluoric acid is charged to a 300-milliliter stainless steel stirring autoclave. Carbon monoxide is injected into the autoclave until a pressure of 500 p.s.i.g. is obtained. A solution of 31 grams of 1,4-dichloro-1,4-dimethylcyclohexane in 66 grams of normal pentane is then pressured into the autoclave during a 15-minute period. During this time the temperature is maintained at 25–27° C. while the pressure rises to 660 p.s.i.g. The contents of the autoclave are then discharged into 166 grams of ice at —80° C. and the product separated by extraction with pentane and alkali into the following products:

(A) 2 g., M.P. 310° C., dibasic acid (sublimes at about 250°).
(B) 4 g., M.P. 189–190°, dibasic acid.
(C) 2 g., M.P. 95.5–97°, di-acyl fluoride.

| | Percent C | Percent H |
|---|---|---|
| Calculated for $C_{10}$ dibasic acid $C_{10}H_{16}O_4$ | 59.98 | 8.058 |
| Found for (A) | 60.33 | 8.14 |
| Found for (B) | 60.28 | 8.07 |
| Calculated for $C_{10}$ diacyl fluoride $C_{10}H_{14}O_2F_2$ | 58.81 | 6.91 |
| Found for (C) | 59.01 | 6.93 |

The diacyl fluoride obtained above reacts slowly when stirred with a 10% alkali solution at 40° C. The resulting product is acidified with concentrated hydrochloric acid to yield a precipitate. The precipitate is filtered and washed with water. The water washed precipitate is recrystallized from an acetic acid and water mixture to yield a dibasic acid having a melting point of 310° C.

*Example IX*

In a two-liter autoclave, 305 grams of sulfuric acid are saturated with boron trifluoride at a pressure of 410 p.s.i.g. and a temperature of 60° C. The autoclave is then cooled to 25° C. and vented to atmospheric pressure in order to remove excess boron trifluoride. Carbon monoxide is then introduced into the autoclave until a pressure of 750 p.s.i.g. is obtained. A solution of 91 grams of 2,5,8-trichloro-2,5,8-trimethylnonane dissolved in 405 grams of normal pentane is injected into the autoclave during a 40-minute period. The temperature of the autoclave is maintained at 45° C. during the introduction of the tertiary halide solution and stirring is continued for 10 minutes after the introduction of the solution. After the reaction with the carbon monoxide is completed, 35 grams of methanol is added to the contents of the autoclave and stirred for 10 minutes at about 30° C. The product of the autoclave is then discharged into 600 grams of ice at a temperature of 0–10° C. The product is extracted with alkali to yield 72 grams of the trimethyl ester of 2,5,8-trimethyl-2,5,8-nonane tricarboxylic acid.

*Example X*

In the same manner as in the preceding examples, 49 grams of 2,4-dichloro-2,4-dimethylpentane is reacted with carbon monoxide in the presence of a hydrofluoric acid catalyst. The final product obtained includes 8 grams of an oily acidic material and 27 grams of neutral oil. Infra-red inspection of the neutral oil indicates the presence of an unsaturated ketone.

*Example XI*

A 65-gram quantity of 2,3-dichloro-2,3-dimethylbutane dissolved in 190 grams of normal hexane is charged to a two-liter stirring autoclave containing hydrofluoric acid and carbon monoxide at a pressure of 680 p.s.i.g. Stirring is continued for 30 minutes at a temperature of 27° C. Water is added to the autoclave and stirring continued for an additional 30 minutes at a temperature of 110° C. The final product of this reaction yields about 8 grams of organic acids and about 25 grams of inerts (alkali-insoluble material). When examined by infra-red analysis these inerts appear to be mostly lactones, boiling above 288° C. and apparently polymeric in structure.

*Example XII*

One mole of 2,5-dimethyl-2,5-dichlorohexane in a hexane solution is treated with carbon monoxide in the presence of 5 moles of hydrofluoric acid at a temperature of 80° F. and a pressure within the range from 400 to 600 p.s.i.g. The liquid contents of the autoclave are then added with stirring to one mole of ethylene glycol at 100±10° F. A plastic product is obtained by removal of the hydrofluoric acid via sparging with nitrogen at 100–110° F., followed by washing with water and alkali, and fractionation to remove by-products such as $C_9$ lactone and small amounts of unsaturated $C_9$ cyclic ketones.

I claim:

1. A process for producing oxygenated organic compounds by reacting ditertiary alkyl halides having less than about 30 carbon atoms with carbon monoxide at a temperature from about 0 to about 100° C. and a pressure of from 1 atmosphere to 3000 p.s.i.g. while in contact with a catalytic amount of a catalyst consisting essentially of hydrofluoric acid, then reacting the resulting product with a material selected from the group consisting of water and primary and secondary alcohols containing up to 20 carbon atoms and recovering a dicarboxylic compound corresponding to the ditertiary alkyl halide.

2. The process of claim 1 wherein the halide atoms of the ditertiary alkyl halide are attached to carbon atoms separated from each other by at least two other carbon atoms and the oxygenated organic compound is the tertiary dicarboxylic acid corresponding to the ditertiary alkyl halide.

3. The process of claim 1 wherein the molar ratio of acid catalyst to ditertiary alkyl halide is from about 2:1 to about 15:1.

4. The process of claim 1 wherein the ditertiary alkyl halide is reacted with carbon monoxide at a temperature from about 10° to about 40° C.

5. The process of claim 1 wherein the molar ratio of acid catalyst to alkyl halide is from about 3:1 to about 5:1.

6. The process of claim 1 wherein the resulting product is reacted with water to form dicarboxylic acid.

7. The process of claim 1 wherein the resulting product is reacted with an alkali to form dicarboxylic acid.

8. The process of claim 1 wherein the resulting product is reacted with a primary alkanol to form an ester of a dicarboxylic acid.

9. The process of claim 1 wherein the resulting product is reacted with water at a temperature within the range from about 50° to about 100° C. to form a dicarboxylic acid.

10. The process of claim 1 wherein the resulting product is reacted with a primary alkanol at a temperature within the range from about 30° to about 70° C. to form an ester of a dicarboxylic acid.

References Cited

UNITED STATES PATENTS

| | | | |
|---|---|---|---|
| 2,542,767 | 2/1951 | Gresham et al. | 260—485 X |
| 2,580,070 | 12/1951 | Brooks et al. | 260—544 |
| 2,680,763 | 6/1954 | Brubaker | 260—485 X |
| 2,742,495 | 4/1956 | Nawiasky et al. | 260—485 |
| 2,791,607 | 5/1957 | Ohlson et al. | 260—537 |
| 2,801,263 | 7/1957 | Hasek et al. | 260—485 |
| 2,831,877 | 4/1958 | Koch | 260—413 |
| 2,864,858 | 12/1958 | Schneider | 260—514 X |
| 2,967,873 | 1/1961 | Koch et al. | 260—514 |
| 2,993,072 | 7/1961 | Chiusoli et al. | 260—537 |
| 3,036,043 | 5/1962 | Gruschke et al. | 260—75 |
| 3,047,539 | 7/1962 | Pengilly | 260—75 |
| 3,052,698 | 9/1962 | Friedman et al. | 260—410.9 |
| 3,099,687 | 7/1963 | Rohlffs et al. | 260—533 |

FOREIGN PATENTS

| | | |
|---|---|---|
| 942,987 | 5/1956 | Germany. |
| 972,315 | 6/1959 | Germany. |

OTHER REFERENCES

Koch et al.: "Liebig's Annalen Der Chemie," vol. 618 (1958), pp. 251–266.

LORRAINE A. WEINBERGER, *Primary Examiner.*

LOUISE P. QUAST, R. K. JACKSON, *Examiners.*

J. J. KLOCKO, M. WEBSTER, *Assistant Examiners.*